US011227157B1

(12) United States Patent
Mathew et al.

(10) Patent No.: US 11,227,157 B1
(45) Date of Patent: Jan. 18, 2022

(54) SYSTEM AND METHOD FOR GAZE DIRECTION DETECTION

(71) Applicant: PANASONIC INTELLECTUAL PROPERTY MANAGEMENT CO., LTD., Osaka (JP)

(72) Inventors: Athul M. Mathew, Singapore (SG);
Ariel Beck, Singapore (SG);
Souksakhone Bounyong, Nara (JP);
Eng Chye Lim, Singapore (SG); Khai Jun Kek, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/003,287

(22) Filed: Aug. 26, 2020

(51) Int. Cl.
*G06K 9/00* (2006.01)
(52) U.S. Cl.
CPC ....... *G06K 9/0061* (2013.01); *G06K 9/00248* (2013.01); *G06K 9/00281* (2013.01); *G06K 9/00604* (2013.01); *G06K 2009/00322* (2013.01)
(58) Field of Classification Search
None
See application file for complete search history.

(56) References Cited

U.S. PATENT DOCUMENTS

2010/0156781 A1* 6/2010 Fahn ............... H04N 21/4788
                                                                345/156
2021/0049760 A1* 2/2021 Yan ...................... G06T 7/0012

FOREIGN PATENT DOCUMENTS

| JP | 2009-297321 A | 12/2009 |
| JP | 2010-134489 A | 6/2010 |
| JP | 2018-101211 A | 6/2018 |

* cited by examiner

*Primary Examiner* — Edward Park
(74) *Attorney, Agent, or Firm* — McDermott Will and Emery LLP

(57) ABSTRACT

A system for gaze direction detection is disclosed herein. The system comprises a face detection unit configured to detect face information from a captured image of a spectator, a head pose unit configured to detect a head pose angle based on the face information; an eye measurement unit configured to detect eye information of at-least one of a left eye or a right eye of the spectator based on the detected face information; an eye-gaze detection unit configured to estimate a gaze angle of the at-least one of the left eye or the right eye of the subject based on the eye information; a conditional gaze detection unit configured to calculate a resultant gaze angle based on the estimated gaze angles of the left eye and right eye and the head pose angle; and an effective gaze detection unit configured to estimate an effective gaze angle based the resultant gaze angle and head-pose angle.

20 Claims, 13 Drawing Sheets

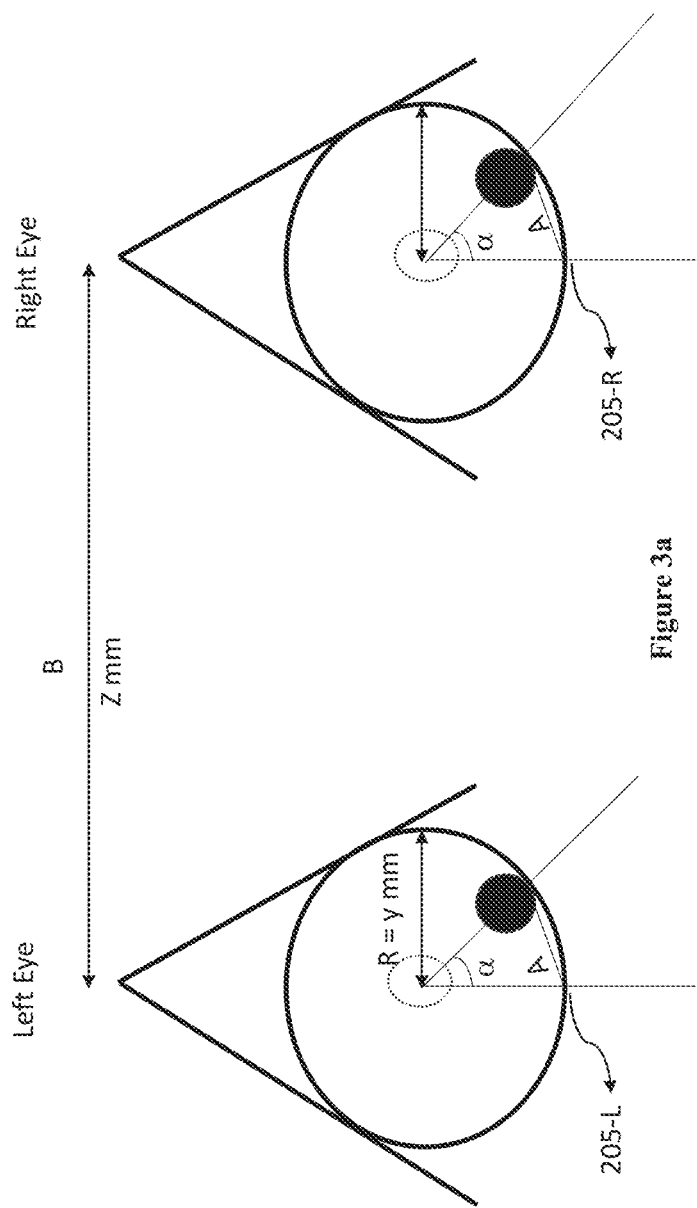
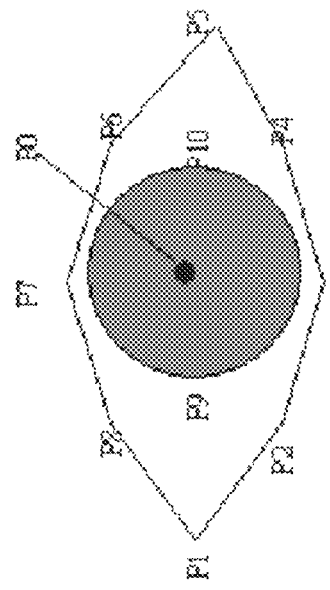
Figure 3a
Figure 3b

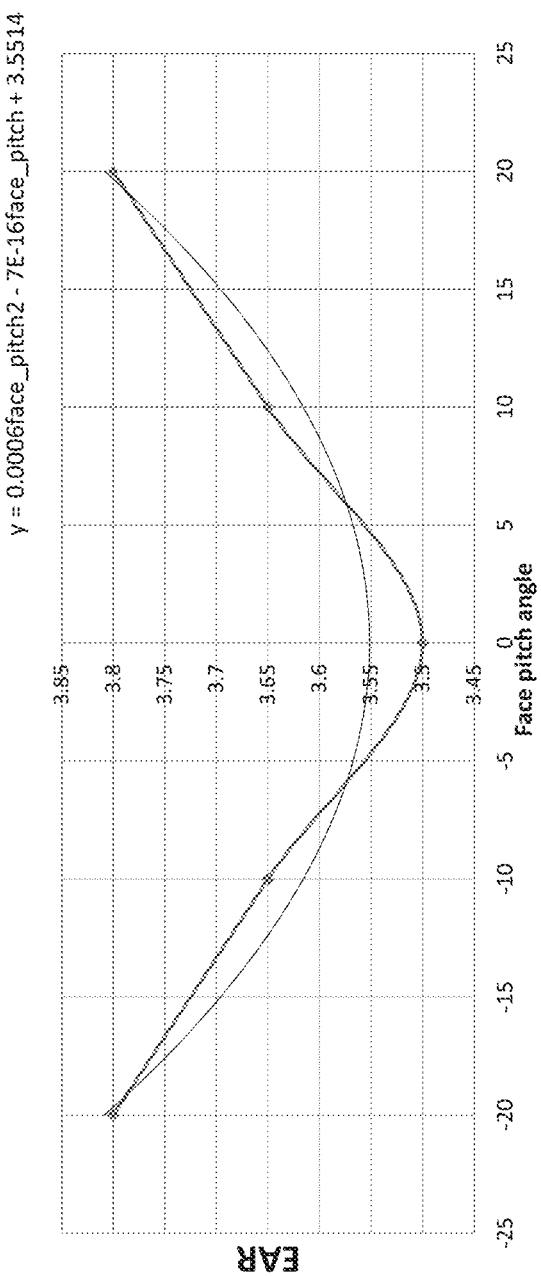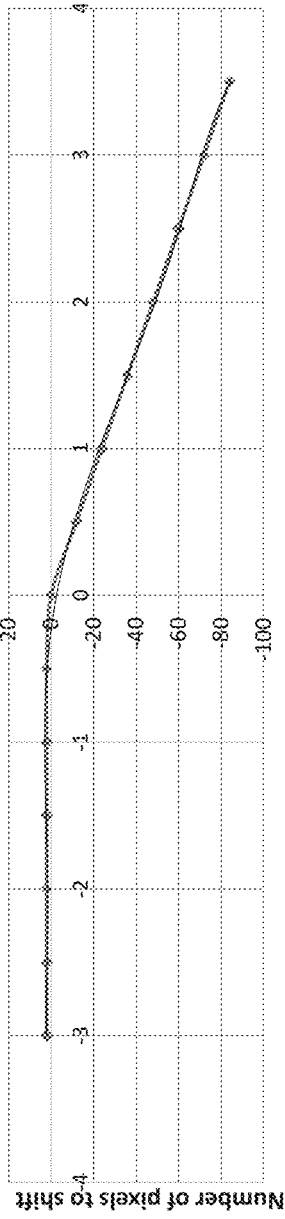

US 11,227,157 B1

SYSTEM AND METHOD FOR GAZE DIRECTION DETECTION

FIELD OF THE INVENTION

The present disclosure, in general, relates to a gaze detection system. More particularly, the invention relates to a system and method for estimating effective gaze detection.

BACKGROUND

With the advancement in digital technology, a digital signage system plays a pivotal role in providing content advertisement to a spectator. The digital signage systems are a kind of digital display system that usually found in public places for advertisement purpose and the like. In an example, the digital signage system displays digital images, video, web pages, weather data, restaurant menus, content advertisement etc. The digital signage system usually estimates a gaze direction of a spectator. However, due to the constant movement of the spectators, counting impressions of the spectators for digital signage requires unconstrained eye gaze estimation for varying head poses. When gaze is fixated at a signage, the eyeball rotates synchronously with the head rotation. However, state of the art 2D eye gaze tracker systems are sensitive to head pose and fail to identify a true gaze of a subject/spectator because appearance of observed eye changes significantly with variations to head pose.

While, 3D gaze tracking systems attempt to overcome the limitation of the 2D eye gaze system, they end up by utilizing high cost multiple camera solutions or subject personalized calibration or bath.

Further, state of the art gaze tracking system usually requires moving of face and eye in the same direction for estimating the eye gaze direction of the spectator. Accordingly, in a real time scenario wherein the eye and the face may move to opposite direction, the state of the art gaze tracking system end up incurring error in estimating a correct/true eye gaze direction of the spectator. Further, the conventional gaze tracking system while estimating a gaze angle does not consider occlusion from various factors like nose.

Thus, there is a need for a solution that overcomes the above limitation of state of the art solution and renders a cost effective and efficient gaze direction detection within minimum optics and electronics.

Thus, there is a need for a solution at determines gaze direction irrespective of the orientation of the head and eye with respect to each other.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

A system for gaze direction detection is disclosed herein. The system comprises a face detection unit configured to detect face information from a captured image of a spectator, a head pose unit configured to detect a head pose angle based on the face information; an eye measurement unit configured to detect eye information of at-least one of a left eye or a right eye of the spectator based on the detected face information; an eye-gaze detection unit configured to estimate a gaze angle of the at-least one of the left eye or the right eye of the subject based on the eye information; and a conditional gaze detection unit configured to calculate a resultant gaze angle based on the estimated gaze angles of the left eye and right eye and the head pose angle; and an effective gaze detection unit configured to estimate an effective gaze angle based the resultant gaze angle and head-pose angle.

In another embodiment, a method for gaze direction detection is disclosed. The method includes detecting face information from a captured image of a spectator, detecting a head pose angle based on the face information and determining an eye information of at-least one of a left eye or a right eye of the spectator based on the detected face information. Thereafter, the method includes estimating a gaze angle of the at-least one of the left eye or the right eye of the subject based on the eye information. Then, a resultant gaze angle is calculated based on the estimated gaze angles of the left eye and right eye and the head pose angle and estimating an effective gaze angle based the resultant gaze angle and head-pose angle.

[WIG] To further clarify advantages and features of the disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein:

FIGS. 3a-3d illustrate a gaze-angle calculation with respect to the spectator 105, in accordance with an embodiment of the present disclosure;

Figure 1:
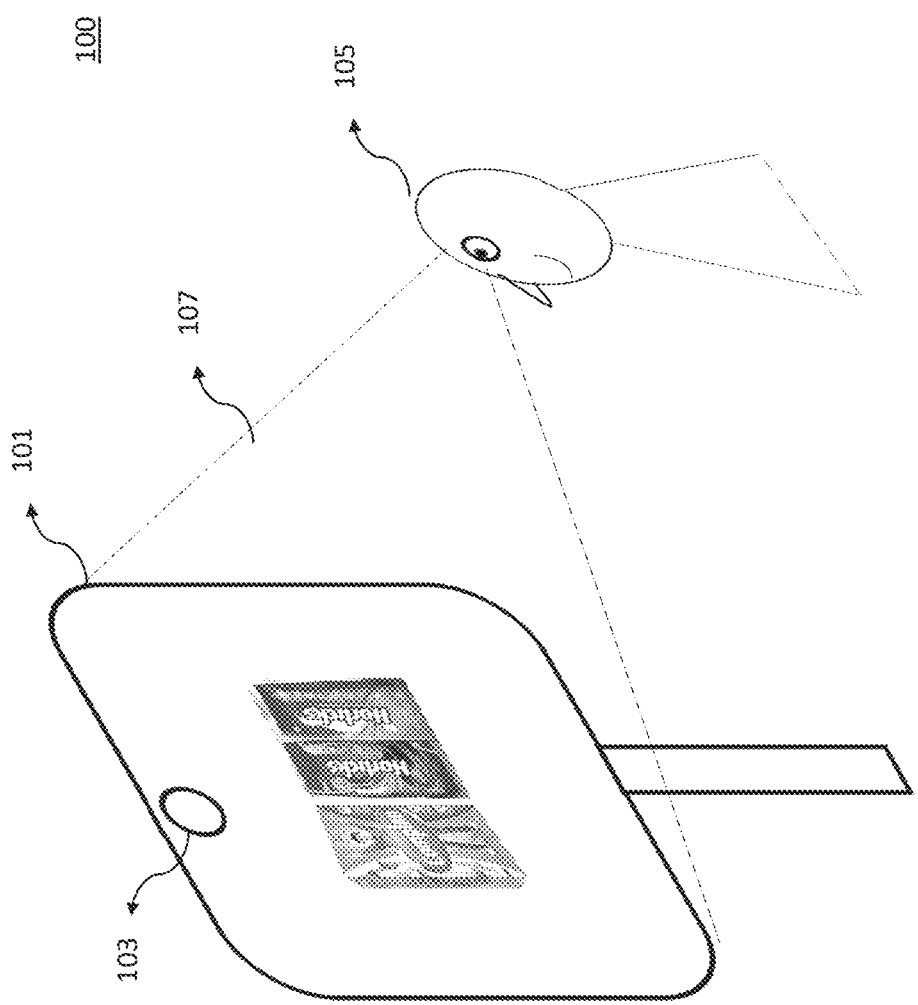
FIG. 1 illustrates an environment 100 for implementing a digital signage system 101 for gaze direction detection; in accordance with an embodiment of the disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to Which this invention belongs. The system, methods, and examples provided herein are illustrative only and not intended to be limiting.

Embodiments of the disclosure will be described below in detail with reference to the accompanying drawings.

FIG. 1 illustrates an environment 100 for implementing a digital signage system 101 for gaze direction detection, in accordance with an embodiment of the disclosure. The environment 100 may include any public place, transportation systems, museums, stadiums, retail stores, hotels, restaurants and corporate buildings etc., for providing wayfinding, exhibitions, marketing and outdoor advertising and the like. The digital signage system 101 may be centrally managed or individually addressable to display text, animation, video messages for advertising, information, entertainment and merchandising to targeted audiences. The digital signage system 101 may be wirelessly connected to a remote server or a cloud server or the like for accessing various information and getting updated. For the sake of brevity, the remote server or the cloud server has not been shown in the FIG. 1. The digital signage system may be alternatively referred as a system or a signage without departing from the scope of the invention.

The digital signage system 101 may include imaging device 103. In an example, the imaging device may include, but not limited to, a CMOS camera, a CCD camera, a monocular camera or the like. In a further example, the imaging device 103 may be embedded in the digital signage system 101. In an exemplary implementation, the imaging device 103 may be configured to obtain video streams of the spectator 105 and capture an image of the spectator 105 from the obtained video streams. Thereafter, the digital signage system 101 may be configured to estimate an eye gaze or impression angle 107 of the spectator 105 by combining a 2D eye gaze angle with a head pose angle estimated from the image by computing an effective gaze of the spectator 105. Thus, the digital signage system 101 may be able to appropriately identify if the spectator 105 is looking at the digital signage system 101 or not being constrained by the movement of the spectator 105 in the given environment 100. The spectator 105 may be alternatively referred as a subject or an observer without departing from the scope of the invention. A detailed implementation of the system 100 will be explained on the forthcoming paragraphs.

Figure 2:
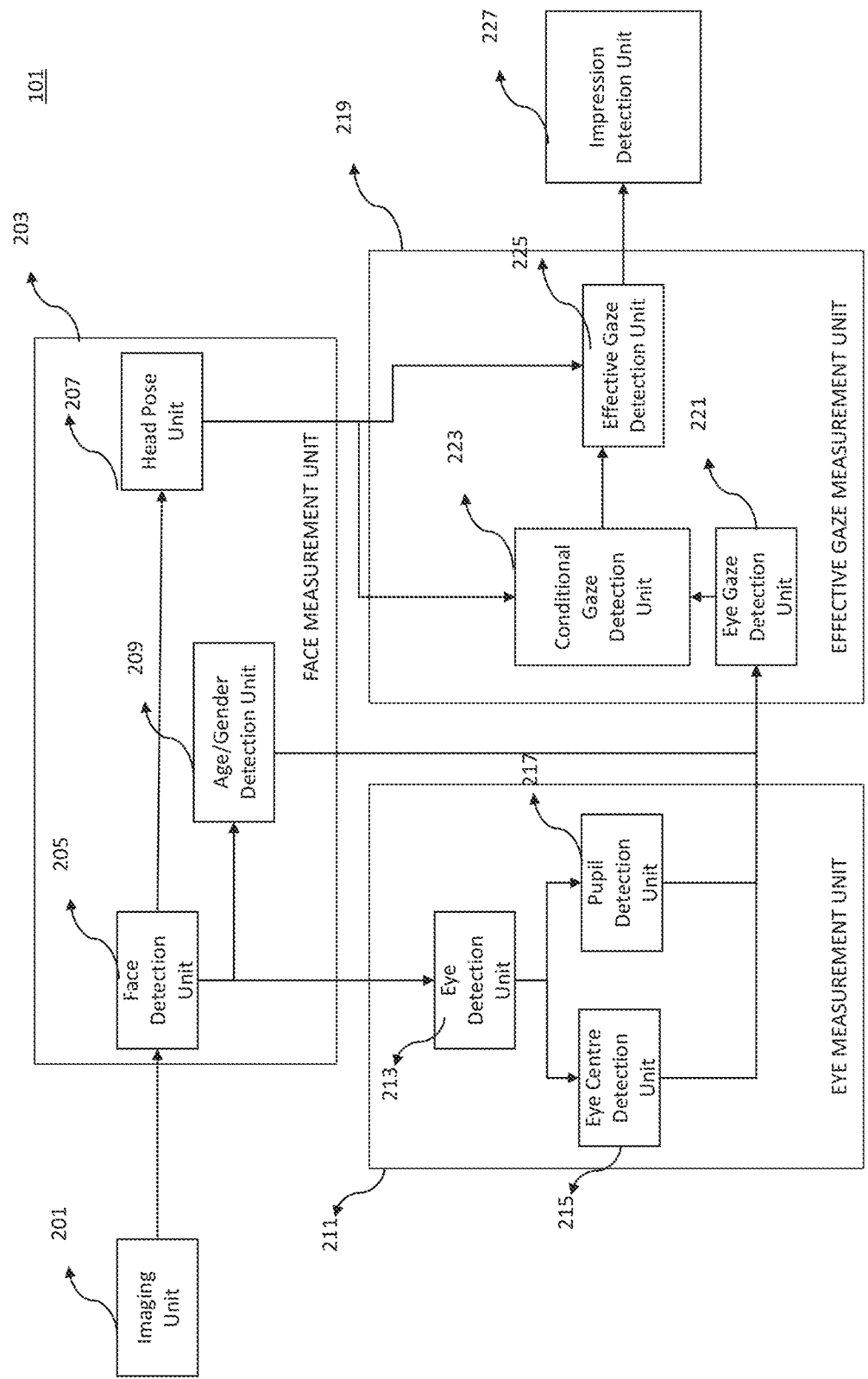
FIG. 2 illustrates digital signage system 101, in accordance Ti an embodiment of the disclosure.

FIG. 2 illustrates digital signage system 101, in accordance with an embodiment of the disclosure. The system 101 may include an interconnection of an imaging unit 201, a face measurement unit 203, an eye measurement unit 211, an effective gaze measurement unit 219, and impression detection unit 227. According to further embodiment of the present disclosure, the face measurement unit 203 includes face detection unit 205, head pose unit 207 and age/¹gender detection unit 209. Further, eye measurement unit 211 may include eye detection unit 213, eye centre detection unit 215 and pupil detection unit 217. Furthermore, effective gaze measurement unit 219 may include eye gaze detection unit 221, conditional gaze detection unit 223 and eye gaze detection unit 225. In an example, the aforementioned components/structure(s) may be configured to operate so as to estimate an effective gaze angle of the spectator 105 and accordingly determining an accurate gaze of the spectator 105.

According to an embodiment of the present subject matter, the imaging unit 210 may be configured to capture an image of the spectator 105. Subsequently, the face detection unit 205 may be configured to determine face information of the spectator 105. As an example, the face information may be, but not limited to, a nose, or an eye of the spectator 105. Alternately, determination of the face information may be referred as face landmark detection executed as a part of state of the art face detection techniques.

According to a further embodiment of the present disclosure, the head pose unit 207 may be configured to determine a head pose angle based on the face information. As an example, the head pose angle may be associated with a movement of the head in any direction. For example, the head movement may include left, right, up, down movement of the head of the spectator 105. As an example, the head pose angle may be determined based on computation of head-pose information. As an example, the head pose information may include a head yaw angle, a face pitch angle, a head roll angle of the head of the spectator 105. The computation of the head yaw angle, the face pitch, the head roll angle of the head of the spectator 105 may be computed by state of the art head pose determination techniques.

According to another embodiment of the present disclosure, the age/gender detection unit 209 may be configured to identify at least one of an age, gender or a race of the spectator based on the face information. The determination of the age, the gender, the race of the spectator 105 may be done as a part of state of the art techniques.

According to another embodiment of the present subject matter, subsequent to the determination of the face information, head pose angle and age/gender/race of the spectator 105, the eye detection unit 213 may be configured to detect eye information of at-least one of a left eye or a right eye of the spectator 105 based on the detected face information in accordance with the forthcoming FIG. 3. Remaining description of FIG. 2 has been provided in later paragraphs after description of FIG. 3.

FIGS. 3a and 3b illustrate eye-center determination and thereby gaze angle calculation, in accordance with an embodiment of the present disclosure. More specifically as depicted in FIG. 3a, the eye centre detection unit 215 may be configured to detect an eye-center information 205-L, 205-R of the left and right eye, respectively as an eye information. The eye-center may be calculated using the centroid of eye landmark points—centroid of points P1-P8 as shown in FIG. 3b. In particular, the eye centre detection unit 215 may be configured to determine eye landmark points for any eye. For example, the eye landmark points may be for example points P1, P2, P3 . . . P8 as the landmark-points of the eye. Thereafter, the eye centre detection unit 215 may be configured to determine a centroid of the eye as an eye center information 205-L, 205-R.

Based thereupon and with reference to FIG. 3a, the pupil detection unit 217 of FIG. 2 may be configured to detect an eye-pupil information of the left eye and the right eye of the spectator 105. As an example, the eye-pupil information may include information about a centre of left eye pupil and right eye pupil. In particular, the pupil detection unit 217 may be configured to determine pupil landmark points for a pupil of the eye. For example, landmark points of the pupil may be points P9 and P10 (as shown in FIG. 3h) as the landmark points of the pupil. Thereafter, the eye centre detection unit 215 may be configured to determine a centroid of the pupil as a pupil center. In an embodiment, determination of the eye pupil information may be referred as a state of the art gaze tracking technique without deviating from the scope of the invention.

According to a further embodiment of the present subject matter, subsequent to the detection of the eye center and pupil information which may be collectively defined as the eye information, the eye gaze detection unit 221 may be configured to estimate a gaze angle of the at least one of the left eye or the right eye of the subject based on the eye information. In an example, a gaze angle may be estimated based on below equations 1 and 2 with reference to FIG. 3a:

$$\text{Gaze angle, } \alpha = \tan^{-1}\frac{x}{R} \qquad (1)$$

$$\text{Where } x = \frac{z*A}{B} \qquad (2)$$

Where,

α=Gaze angle x=displacement a centre of the eye and centre of the pupil of the eye in a decimal numeral system in mm.

A=displacement/distance between eye center & pupil center in pixels of any one of the left eye or right eye as determined based on gaze tracking, B=distance between a center of left eye and right eye in pixels determined based on face landmark, z=a statistical inter eye distance (mm) of human being, e.g. 64 mm; and R=a statistical human-eye radius (mm), e.g. 12.5 mm.

As an example, the statistical human-eye radius (R) of human eye ball is found to be approximately 12-13 mm and the statistical inter eye distance of human being (z) for an adult is found to be approximately ranging from 63-64 mm. Further, the statistical inter eye distance of human being (z) for human like kid is found to be 50 mm. As an example, variables R and z may vary according to the determination of an age, gender and/or race of the spectator 105 by the age/gender detection unit 209.

FIGS. 3c and 3d illustrate eye centre correction due to vertical gaze in accordance with an embodiment of the present subject matter. More specifically, the eye centre determined in FIG. 3b may be further corrected by the eye measurement unit 211. Considering a scenario when a spectator 105 looks down, in that case the eye centre shifts down. This is so since the center of the eye has been determined by determining the centroid of eye landmark points as eye centre as explained above. Thus, when a person looks down it is difficult to find the any vertical displacement between eye centre & pupil centre. That is as per the equation 1, it difficult to determine the value of 'A'. At least to overcome such deficiency, the eye measurement unit 211 may be configured to calculate an Eye Aspect Ratio (EAR) information of the spectator 105, The Eye Aspect Ratio (EAR) information of the spectator 105 may be determined in accordance with FIG. 3h based on below equation (3), $$EAR = \frac{P5 \cdot X - P1 \cdot X}{P3 \cdot Y - P7 \cdot Y} \qquad (3)$$

After the determination of the EAR, the eye measurement unit 211 may be configured to observe a variation in the face pitch based on the head pose information and thereby calculate an "average EAR" in accordance with FIG. 3c as follows:

$$(0.006*\text{faceP}_{pitch}^2 - 7e^{-16}*\text{face}_{pitch} + 3.551.4) \qquad (1)$$

As an example, the variation in the face pitch may include up or down movement of the head of the spectator 105. As an example, let say the frontal pose pitch is obtained as 0 and EAR is obtained as 3.5. In such a scenario, the system 101 may shifts/move the imaging device 201 up/down at this EAR such that the distance between eyelids appear closer.

Based on the average EAR as calculated in Equation 4, the determined EAR may be corrected based on the said average EAR as follows:

$$[EAR - (0.006*\text{face}_{pitch}^2 - 7e*\text{face}_{pitch} + 3.5514)] \qquad (5)$$

After the EAR correction, the corrected Eye Aspect Ratio (EAR) information is used to shift the eye centre up when person looks down and accordingly correct the eye centre as earlier determined by FIG. 3(b) in accordance with the following equation (6):

Eye centre=$\{P1.y+P5.y+[\max\{-0.1, EAR-(0.006*\text{face}_{pitch}^2*\text{face}_{pitch}+3.5514)\}]*-24\}/2$ (6)

A relation between corrected EAR and eye center shift has been depicted in FIG. 3(d). Overall, based on the eye centre shift done in accordance with Equation 6, the eye measurement unit 211 may be configured to correct the determined eye center based on shifting by a predetermined number of pixels based on said corrected EAR. As may be understood, said correcting comprises shifting the center of at least one of the left eye or the right eye of the subject in accordance with the corrected EAR. Thereafter, the eye measurement unit 211 may be configured to calculate the gaze angle α for any eye based on the shifted center of at least one of the left eye or the right eye of the subject.

According to a further embodiment of the present subject matter, subsequent to the determination of gaze angle α, the conditional gaze detection unit 223 in FIG. 2 may be configured to calculate a resultant gaze angle as a conditional gaze angle based on the estimated gaze angles of the left eye and right eye and the head pose angle. As an exemplary scenario, let us consider a case where the imaging device 201 may be unable to obtain an appropriate image of an eye due to occlusion from nose which may occur due to error in estimating head pose or eye by the face measurement unit 203. In order to, overcome aforementioned problem, the conditional gaze detection unit 223 calculates a resultant gaze angle as a conditional gaze angle based on a contribution level of a left eye or the right eye.

The conditional gaze angle may be determined based on following equation:

$$\alpha=[(0.01x+0.5)*\alpha\_\text{left}]+[(0.5-0.01x)*\alpha\_\text{right}] \quad (7)$$

Where, x=subjects head pose angle
α_left=left eye gaze angle
α_right=right eye gaze angle The conditional gaze angle refers a relationship between the eye gaze angle of each eye and the head pose angle and may be directly used for prediction by the impression detection unit 217 as described later in paragraphs.

According to a further embodiment of the present subject matter, the conditional gaze detection unit 223 may be configured to determine a contribution level of the right eye as higher when the head pose may correspond to a leftward head movement of the spectator 105. The conditional gaze detection unit 223 may be configured to determine a contribution level of the left eye as higher when the head pose corresponds to a rightward head movement of the spectator 105. Thus, a value of an eye having a higher contribution level may be taken in consideration for calculating a resultant gaze angle. Remaining description of FIG. 2 has been provided in later paragraphs after description of FIG. 4.

Figure 4:
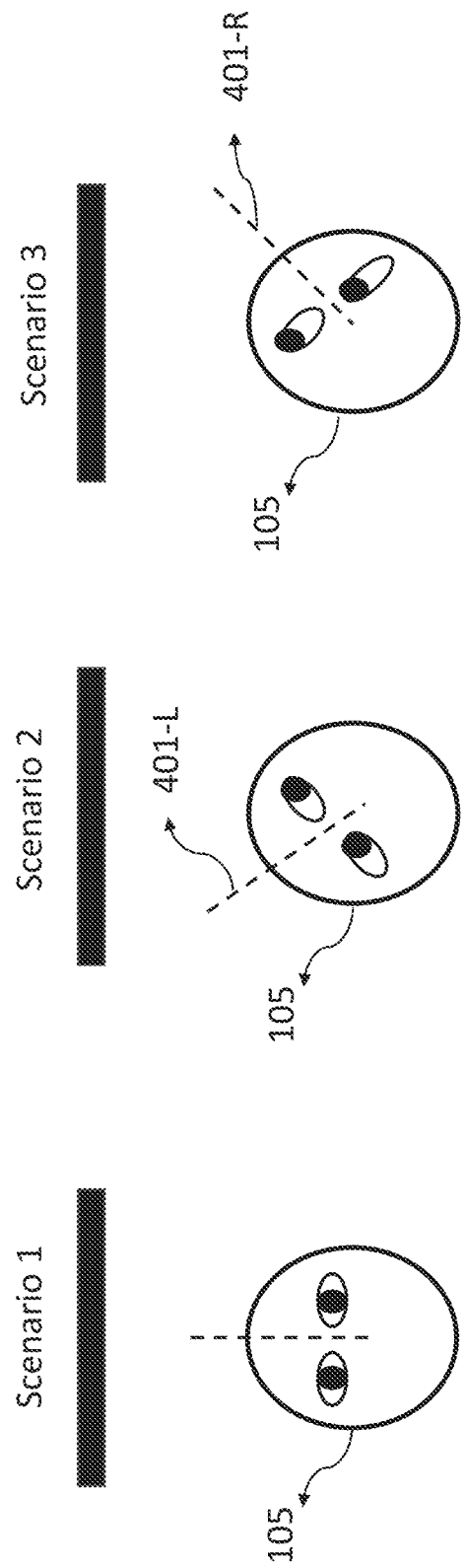
FIG. 4 illustrates an exemplary scenario for determining conditional gaze angle, in accordance with an embodiment of the present disclosure.

FIG. 4 illustrates an exemplary scenario for determining conditional gaze angle, in accordance with an embodiment of the present disclosure. Based on head pose, the contribution of left eye and right eye is weighed to estimate eye gaze angle. At least an underlying reason behind such weighing is that the eye farthest away from the camera (on basis of orientation of face) is prone to various disturbances such as occlusion from nose due to head pose & eye landmark estimation errors. In accordance with FIG. 4, the contribution of left & right eye are weighed towards final eye gaze angle estimation based on the orientation of the face.

The present FIG. 4 contemplates a scenario wherein the digital signage is embedded with an embedded camera system and the subject 105 looks at the signage in accordance with the three configurations.

In scenario 1, the subject looks directly at the signage and accordingly the head pose angle x in accordance with Equation 7 is null. Equal contribution from left & right eye for gaze estimation and the Equation 7 becomes as follows:

$$a=[(0.5)*\alpha\_\text{left}]+[(0.5)*\alpha\_\text{right}] \quad (8)$$

In other words, when face is frontal, the weight assigned may be 50% weight to each eye.

Let say, in scenario 2, the subject 105 is facing signage board at an angle with face turned towards left side 401-L. The subject 105 looks at the signage by directing eye gaze towards right, Let say, the subject's 105 head pose angle is 10° to the left then the value of x=10. Accordingly, in scenario 2, when subject looks to the right, the equation 7 becomes:

$$\alpha=(0.6*\alpha\_\text{left})+(0.4*\alpha\_\text{right}). \quad (9)$$

Thus, a weight of contribution level of left eye may be considered as higher.

Similarly, in scenario 3, the subject 105 is facing signage board at an angle with face turned towards right side 401-R. The subject 105 looks at the signage by directing eye gaze towards left. Let say, the subject's 105 head pose angle is 10° to the right then the value of x=−10. When subject looks to the left, then the equation 7 becomes:

$$\alpha=(0.4*\alpha\_\text{left})+(0.6*\alpha\_\text{right}) \quad (10)$$

Thus, a weight of contribution level of right eye may be considered as higher. Therefore, by assigning a weight for left eye and right eye, instead of rejecting an eye completely, provides better results than selecting one eye as the information of both the eyes have been combined.

In other words, when face is turning left 10 degree the weight assigned may be 60% weight to right eye and 40% weight to left eye. When face is turned left 20 degree, the weight assigned may be 70% weight to right eye and 30% weight to left eye; and so on.

Continuing with further description of FIG. 2 and according to a further embodiment of the present subject matter, a resultant gaze angle is subsequently calculated. The effective gaze detection unit 225 may be configured to estimate an effective gaze angle based on the resultant gaze angle and head-pose angle. The effective gaze angle may be determined based on the below equation (7) that may also be referred as prediction formula.

$$\gamma=0.55\phi+\alpha \quad (11)$$

Where, γ=effective gaze angle;
φ=head pose angle; and
α=conditional eye gaze angle as calculated in FIG. 4

According to a further embodiment of the present subject matter, conditional gaze detection unit 223 may be configured to trigger the impression detection unit 227 to draw the prediction as to whether or not the spectator is gazing at an object based on the conditional angle of Equation 7 alone.

According to a further embodiment of the present subject matter, subsequent to the estimation of the effective angle, the impression detection unit 227 may be configured to predict whether or not the spectator is gazing at the signage based on the effective gaze angle. In an example, the said prediction being based on effective gaze angle as obtained from Equation 11.

In an example, if absolute value of effective gaze angle<=a threshold value say x degree, then it is considered that the subject is "Looking" at signage. However, if absolute value of effective gaze angle>x degree, then it is considered "Not Looking".

Figure 5:
FIG. 5 illustrates an exemplary scenario of implementing effective gaze angle, in accordance with an embodiment of the present disclosure.
Figure 5:
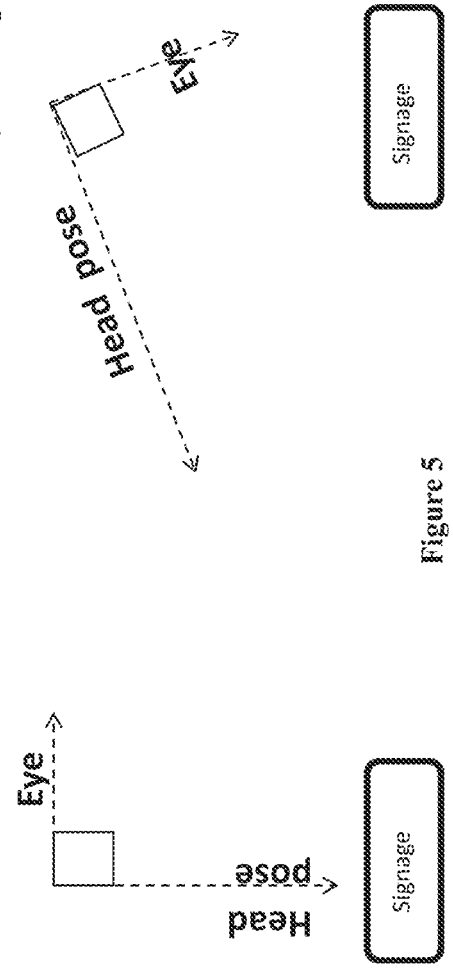

FIG. 5 illustrates an example implementation of impression detection unit 227 based on the effective gaze angle as achieved in Equation 11.

In Scenario A & Scenario B as shown in FIG. 5, the subject's eye gaze is the same—looking towards the right. However, in Scenario A the subject is not looking at the signage/camera. On the other hand, in Scenario B the subject is looking at the signage/camera. With respect to state of the art mechanisms, it is not possible to estimate if a subject is looking at the signage using 2D gaze alone and accordingly the state of the art ends up utilizing complex 3D gaze estimation based on multiple cameras, or subject personalised calibration. In contrast, the present subject matter at least based on said effective gaze calculation through Equation 7 and 11 renders a low cost monocular camera solution by combining head pose information with 2D eye gaze.

In scenario A, the subject 105 is not looking at the signage/camera. In scenario B, the subject 105 is looking at the signage/camera. Accordingly, for scenario A, the effective gaze angle will be a high value (for example, 30 degree), thereby indicating that the subject 105 is looking away. For scenario B, the effective gaze angle which is a combination of head pose angle & 2D gaze angle will be a small value (~0) thereby determining that subject 105 looking at signage (for example, <5 degree), In an example after substituting the values of head pose angle & gaze angle an absolute value may be considered for determining effective angle.

Figure 6:
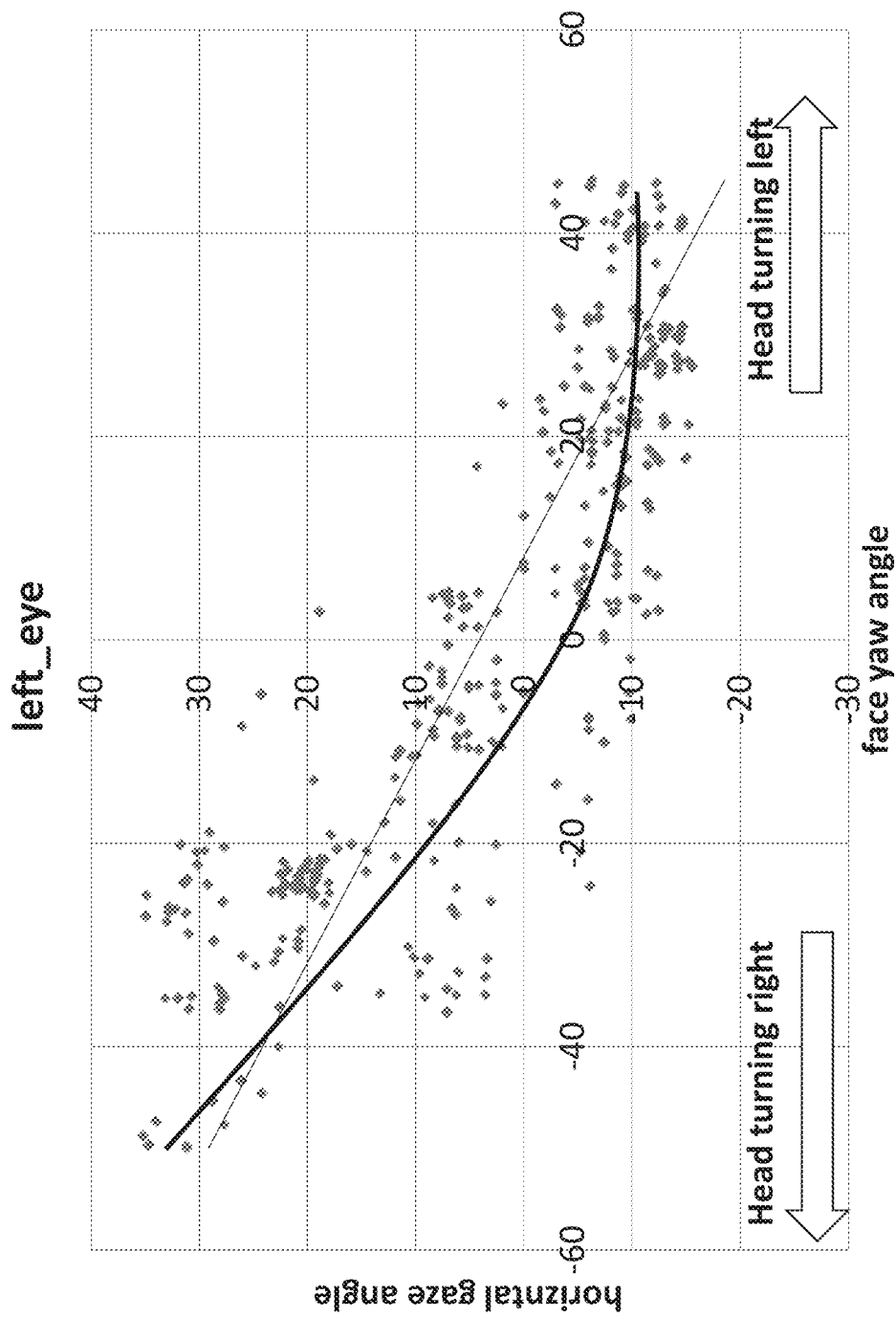
FIG. 6 illustrates a graphical representation for verifying gaze-angle calculation, in accordance with embodiment of the present disclosure.
Figure 7:
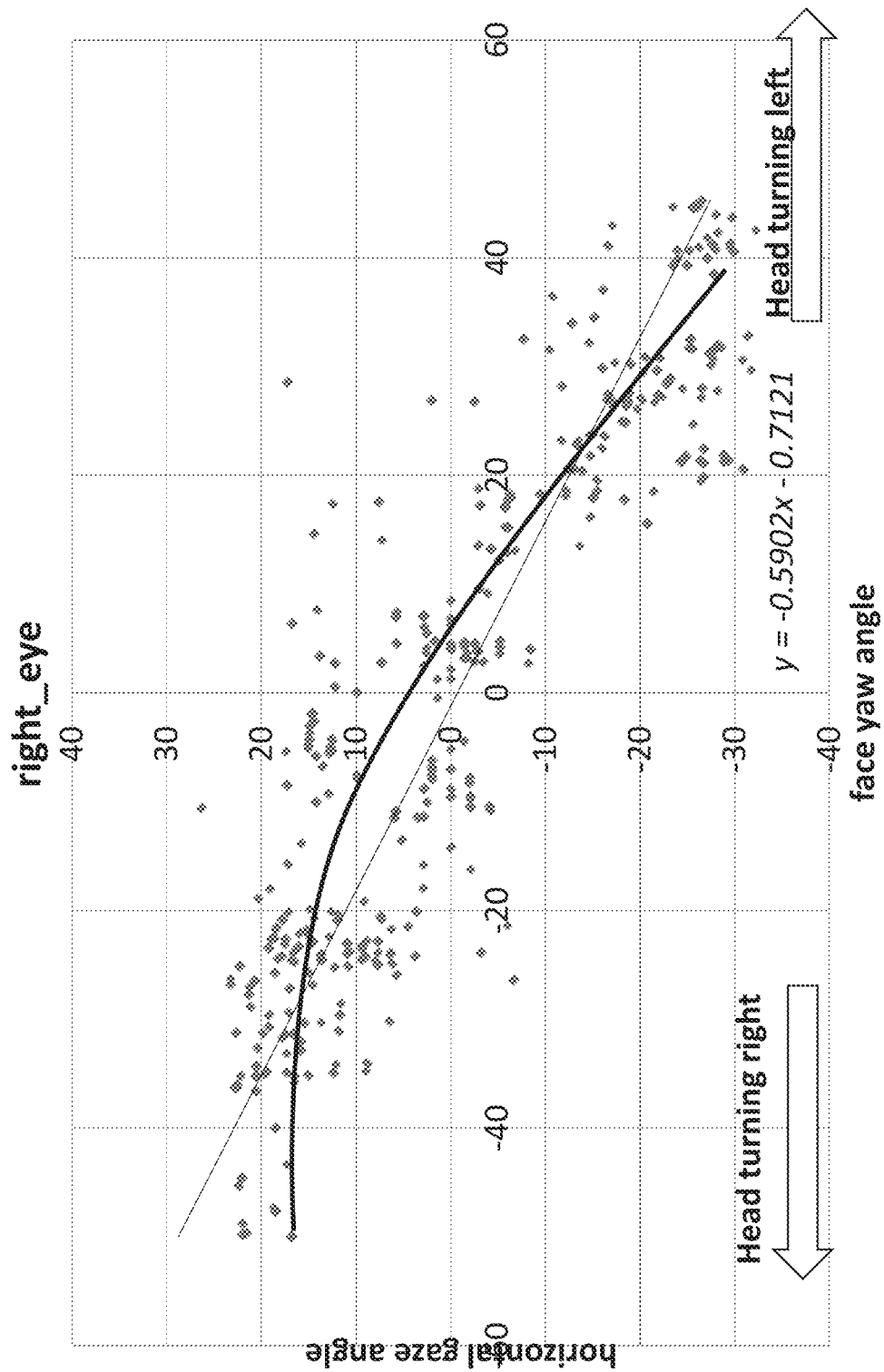
FIG. 7 illustrates another graphical representation for verifying gaze-angle calculation, in accordance with an embodiment of the present disclosure.

FIG. 6 and FIG. 7 illustrate an example use-case scenario depicting utility of effective gaze calculation. More specifically, FIG. 6 and FIG. 7 illustrate two graphical representation depicting eye gaze angle v/s head pose angle plots for left eye and right eye, respectively.

Data is collected using a webcam. User is asked to freely change head pose while constantly looking at the camera. Head pose angle and eye gaze angle are recorded in order to analyse the relationship between the two quantities. In FIG. 6, Left eye gaze angle has linear relationship with head pose angle when head turns to the right. In FIG. 7, the Right eye gaze angle has linear relationship with head pose angle when head turns to the left.

The aforesaid at least verifies the utility of conditional gaze angle calculation through Equation 7 based on weighing the contribution of the eye side based on orientation of the face. Fitting a linear curve to the data shows the change in eye gaze angle is approx. 50% of the change of head pose angle when a subject changes face orientation while looking at a fixed point in the scene. Hence based on data analysis, calculation of effective gaze angle through Equation 11 is substantiated.

Figure 8:
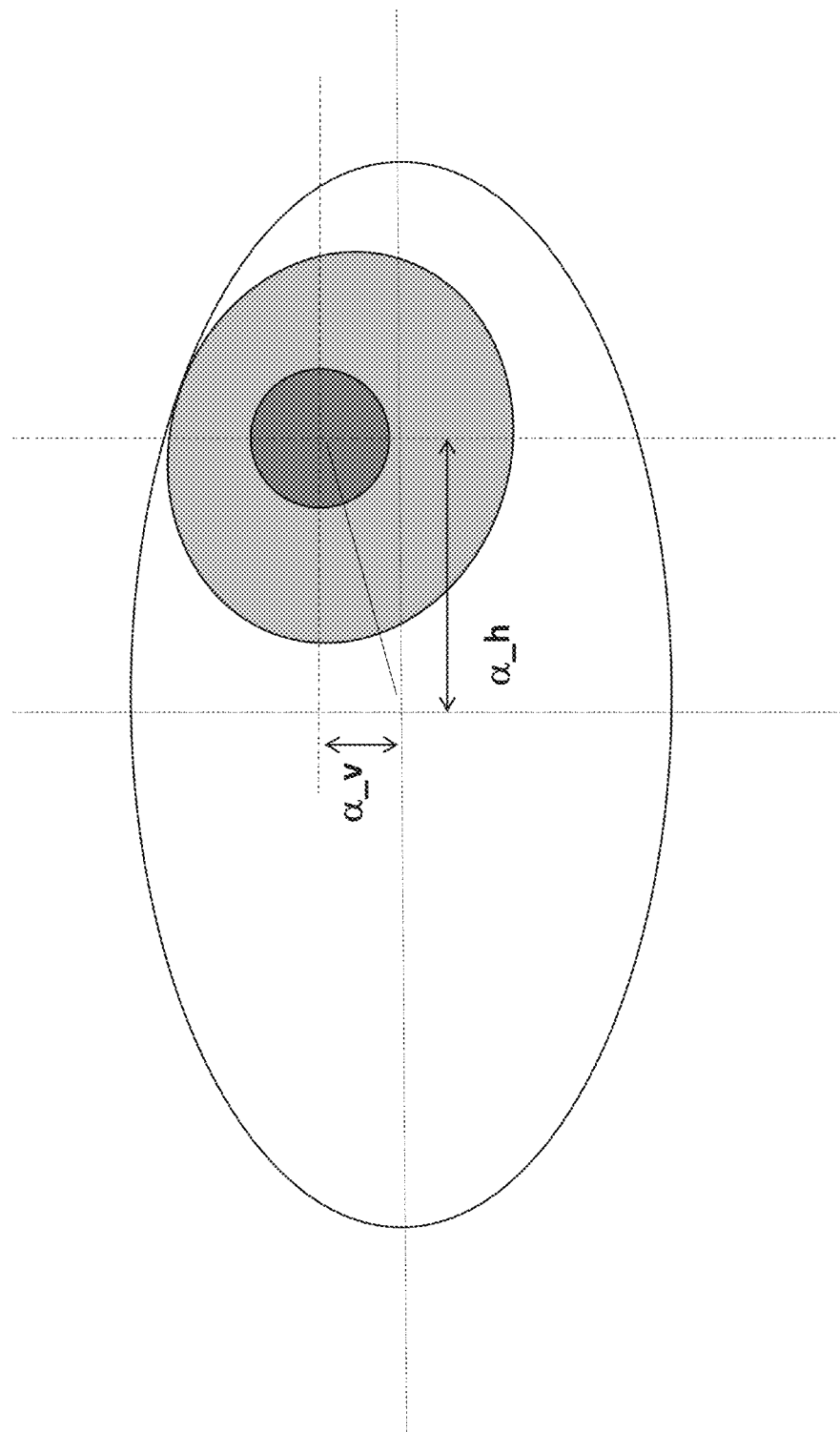
FIG. 8 illustrates gaze correction for horizontal gaze correction & vertical gaze correction, in accordance with the embodiment of the present subject matter.

FIG. 8 illustrates gaze correction for horizontal gaze correction & vertical gaze correction, in accordance with the embodiment of the present subject matter. For horizontal gaze angle correction, the horizontal face and eye components are utilized in the equation 11. Thus, $\gamma$ becomes $\gamma\_h$, $\phi$ becomes $\phi\_h$, $\alpha$ becomes $\alpha\_h$. On substituting the said values in equation 11, the prediction formula becomes $$\text{Horizontal Effective gaze angle, } \gamma\_h = 0.55\phi\_h + \alpha\_h \quad (12)$$

Where, $\phi\_h$ is face yaw angle and $\alpha\_h$ is horizontal eye gaze angle.

For vertical gaze angle correction, the vertical face and eye components are utilized in the equation 11. Thus, $\gamma$ becomes $\gamma\_V$, $\phi$ becomes $\phi\_v$, $\alpha$ becomes $\alpha\_V$. On substituting said values in equation 11, the prediction formula becomes $$\text{Vertical Effective gaze angle: } \gamma\_v = 0.55\phi\_v + \Delta\_v \quad (13)$$

Where, $\phi\_v$ is face pitch angle and $\alpha\_v$ is vertical eye gaze angle.

Figure 9:
FIG. 9 illustrates a flowchart of a method 900 for gaze direction detection, according to an embodiment of the present disclosure.

FIG. 9 illustrates a flowchart of a method 900 for gaze direction detection, according to an embodiment of the present disclosure. The method 900 may be implemented by the system 101 using components thereof, as described above. In an embodiment, the method 900 may be executed by the face measurement unit 203, eye measurement unit 211, and effective gaze measurement unit 219 and components therein. Further, for the sake of brevity, details of the present disclosure that are explained in detail in the description of FIG. 1-FIG. 2, and therefore not disclosed herein.

At block 901, the method 900 includes capturing an image of a spectator. The method 900 further includes communicating the captured image of the spectator 105 to the face detection unit 205.

At block 903, the method 900 includes detecting face information from a captured image of the spectator 105.

Thereafter, at block 905, the method 900 includes detecting a head pose angle based on the face information.

Thereafter, at block 907, the method 900 includes detecting an eye information of at-least one of a left eye or a right eye of the spectator based on the detected face information. The method 900 further includes detecting an eye-center information and eye-pupil information as the eye information. As an example, a center of the right eye or the left eye corresponds to the eye information, and a center of the right pupil or the left pupil of the respective right eye or the left eye corresponds to the pupil information of the spectator 105.

Thereafter, at block 909, the method 900 includes estimating a gaze angle of the at-least one of the left eye or the right eye of the subject based on the eye information. In an implementation the method 900 computes the gaze angle of the left eye based on a distance between a center of the left eye and a center of the left eye's pupil and a statistical human eye radius. The method computed the gaze angle of right eye based on a distance between a center of the right eye and a center of the right eye's pupil and the statistical human eye radius. Thereafter, the gaze angle is estimated for the left eye by receiving a first distance (A) between a center of the left eye and a center of the left eye's pupil, said first distance quantified in pixels and having been determined based on gaze tracking. Then, a second distance (B) between a center of the left eye and a center of the right eye is gathered in pixels, said second distance quantified in pixels and having been determined based on face landmark detection. After that, a ratio (A/B) of first distance to the second distance is computed. Then, a displacement (x) between a center of the eye and center of the pupil of the eye calculated in a decimal numeral system based on said ratio and a statistical inter eye distance of human being. The gaze angle ($\alpha$) of the left eye is calculated based on said displacement (x) and a statistical human-eye radius. Likewise, the gaze angle ($\alpha$) of right eye is calculated.

Thereafter, at block 911, the method 900 includes calculating a resultant gaze angle (i.e. conditional gaze angle) based on the estimated gaze angles of the left eye and right eye and the a gathered head pose angle. In particular, the method 900 includes calculating the resultant gaze angle based on the gaze angle of the left eye and the right eye and the head pose angle by analyzing a contribution level of left eye and right eye. The calculation of the resultant gaze angle includes initially weighing a contribution level of the right eye as higher when the head pose corresponds to a leftward head movement of the spectator. Thereafter, a contribution level of the left eye is weighed as higher when the head pose corresponds to a rightward head movement of the subject. Then, said resultant angle is calculated as a conditional gaze angle based on integration of one or more of the weighed contribution level of left eye and the right eye, the determined gaze angle of the right eye and left eye, and the head pose angle. Thereafter, at block 913, the method 900 includes estimating an effective gaze angle based the resultant gaze angle and head-pose angle.

Thereafter, at block 915, the method 900 includes predicting whether or not the spectator is gazing at an object based on the effective gaze angle. As an example, the prediction is being triggered by the block 911. Thereafter, the impression detection unit 227 is triggered to draw the prediction as to whether or not the spectator is gazing at an object based on said conditional gaze angle and said effective gaze angle. The conditional gaze angle denotes the relationship between the eye gaze angle of each eye and the head pose angle.

In a further example, the method 900 further includes identifying at least one of an age, gender or a race of the spectator based on the face information and thereby enable the estimation of the gaze angle by the eye-gaze detection unit. As an example, the method 900 further includes computing the average inter-eye distance and the average radius of the human eye is computed based on the identified least one of an age, gender or a race of the subject 105.

In a further example, the method 900 further includes correcting the determined to eye center. The correction of the eye center may include initially determining an Eye Aspect Ratio (EAR) information of the spectator. Then, variation in face pitch is observed based on a head pose information of the spectator. Then, the EAR is corrected based on the said observed variation. The determined eye center is corrected based on shifting by a predetermined number of pixels based on said corrected EAR, said correction comprising shifting the center of at least one of the left eye or the right eye of the subject in accordance with the corrected EAR. Thereafter, the gaze angle is calculated based on the shifted center of at least one of the left eye or the right eye of the subject.

As can be seen from the above, according to the present disclosure of the invention the present invention offers a low cost solution to count digital signage impression by using simple low cost camera like monocular camera. There is no requirement of any specially designed hardware. Further, according to an aspect of the invention the present invention is independent of distance between user and camera thus allowing the user to move freely around in an environment and still be able to keep in track of the eye gaze. Furthermore, the gaze correction capability provides an accurate measurement of eye gaze in any of the aforementioned scenario. The present disclosure provides an effective gaze even if eye and face moving in opposite direction.

Figure 10:
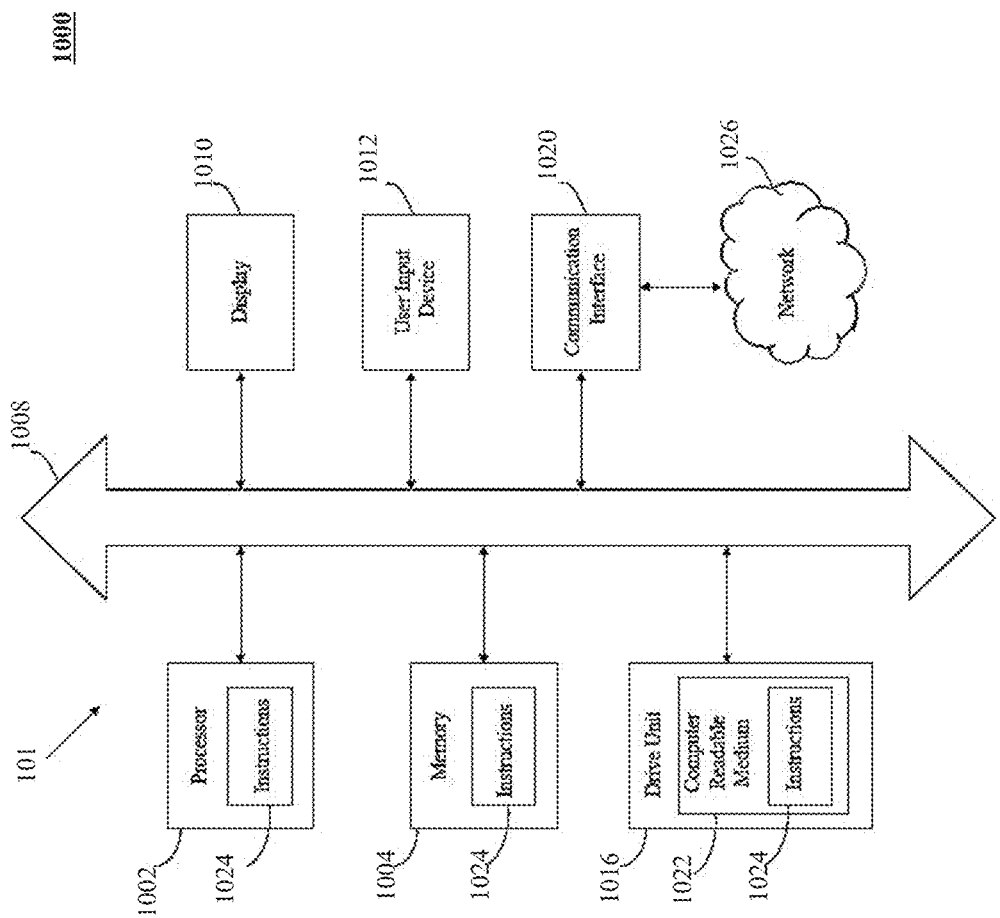
FIG. 10 illustrates an implementation of the system 101 as illustrated in FIG. 2 in a computing environment.

FIG. 10 illustrates an implementation of the signage system 101 as illustrated in FIG. 2 in a computing environment. The present figure essentially illustrates the hardware configuration of the system 400 in the form of a computer system 1000 is shown. The computer system 1000 can include a set of instructions that can be executed to cause the computer system 1000 to perform any one or more of the methods disclosed. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1000 is illustrated, the term "system" shall also be taken to include any collection of systems or sub-systems that individually or jointly execute a set, or multiple sets, of instructions to perform one or more computer functions.

The computer system 1000 may include a processor 1002 (e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data The processor 1002 may implement a software program, such as code generated manually programmed).

The computer system 1000 may include a memory 1004, such as a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1004 includes cache or random access memory for the processor 1002. In alternative examples, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may or may not further include a display unit 1010, such as a liquid crystal display (LCD), an organic light emitting diode (MED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1016.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the computer system 1000.

The computer system 1000 may also include a disk or optical drive unit 1016. The disk drive unit 1016 may include a computer-readable medium 1022 in which one or more sets of instructions 1024, e.g. software, can be embedded. Further, the instructions 1024 may embody one or more of the methods or logic as described. In a particular example, the instructions 1024 may reside completely, or at least partially, within the memory 1004 or within the processor 1002 during execution by the computer system 1000. The memory 1004 and the processor 1002 also may include computer-readable media as discussed above.

The present invention contemplates a computer-readable medium that includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020 or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000 or combinations thereof. The connection with the network 1026 may be a physical connection, such as a wired Ethernet connection or may be established wirelessly as discussed later. Likewise, the additional connections with other components of the system 1000 may be physical connections or may be established wirelessly. The network 1026 may alternatively be directly connected to the bus 1008.

The network 1026 may include wired networks, wireless networks, Ethernet AVB networks, or combinations thereof. The wireless network may be a cellular telephone network, an 802.11, 802.16, 802.20, 802.10 or WiMax network. Further, the network 1026 may be a public network, such as the Internet, a private network, such as an intranet, or combinations thereof, and may utilize a variety of networking protocols now available or later developed including, but not limited to TCP/IP based networking protocols.

In an alternative example; dedicated hardware implementations, such as application specific integrated circuits; programmable logic arrays and other hardware devices, can be constructed to implement various parts of the system 1000.

Figure 11:
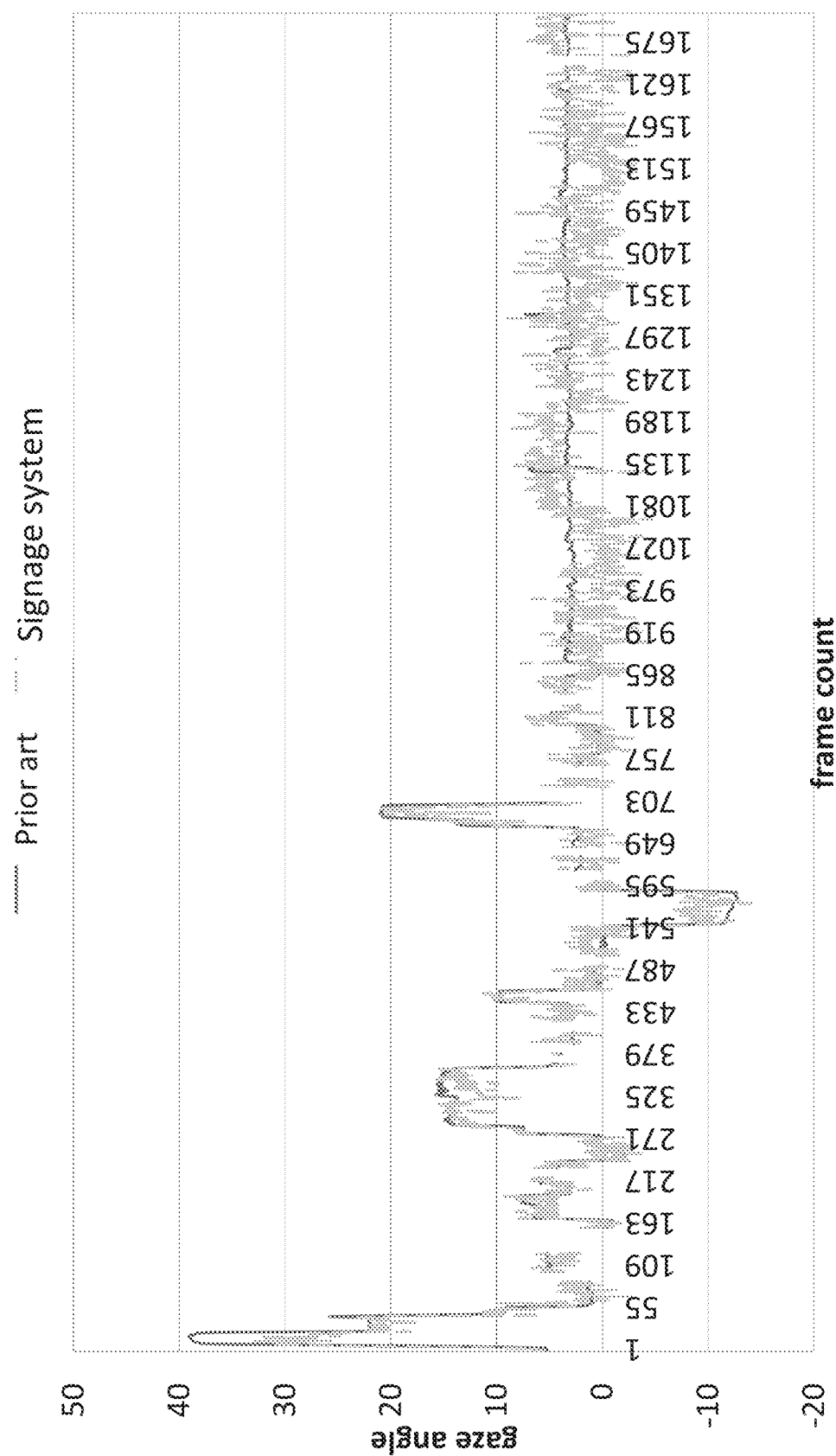
FIG. 11 illustrates an example illustration depicting accuracy of gaze angle calculation.
Figure 12:
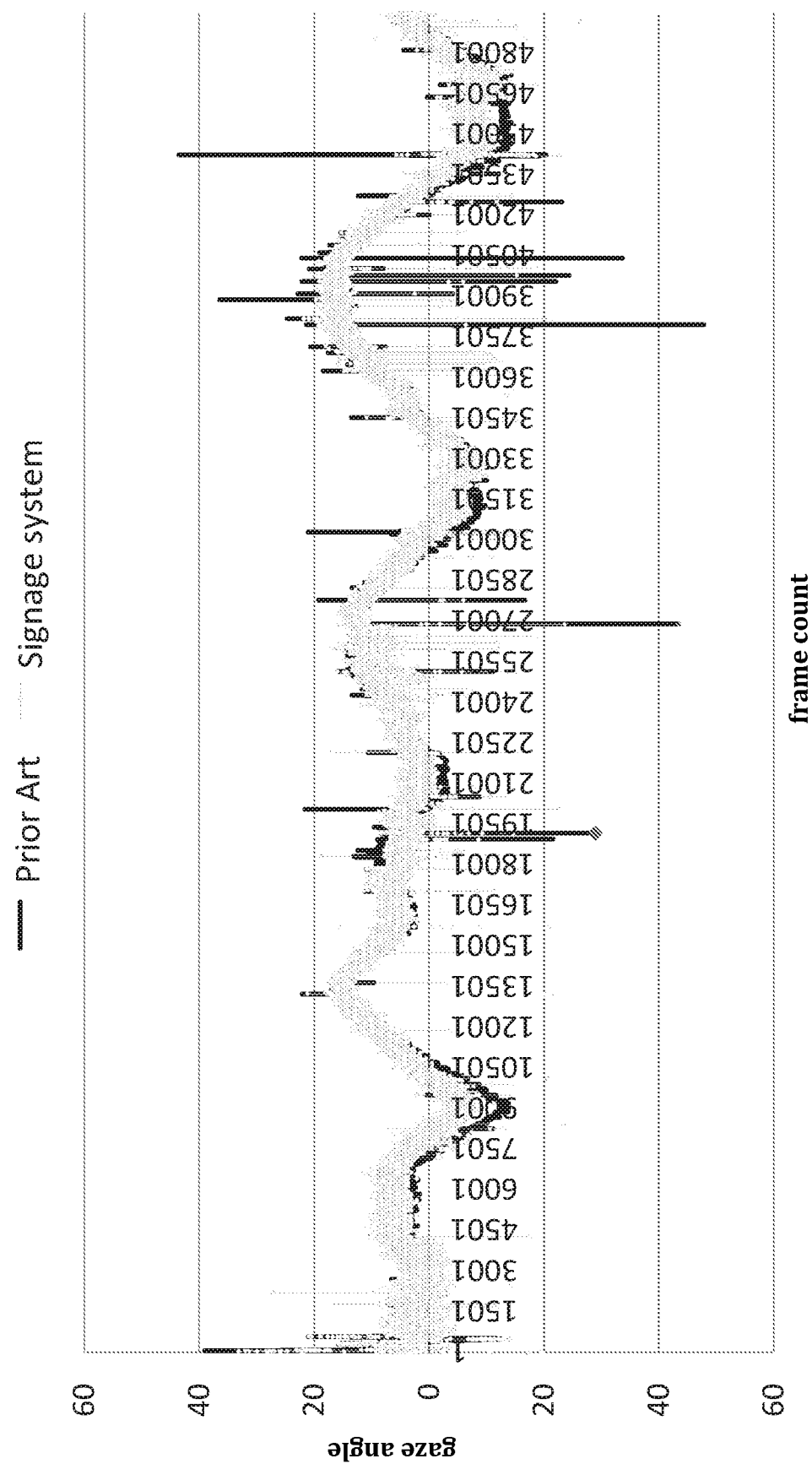
FIG. 12 illustrates another example illustration depicting accuracy of gaze angle calculation.

FIGS. 11 and 12 illustrates example results related to application of gaze conditional gaze angle, and effective gaze angle within the present signage system 101. More specifically, FIG. 11 and FIG. 12 refer results of the present gaze angle estimation and compared with a state of the art gaze detection system, which is based on advanced eye tracking systems 3 cameras. As indicated, the signage system 101 follows same trendline like prior art.

Terms used in this disclosure and especially in the appended claims e.g., bodies of the appended claims) are generally intended as "open" terms e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A gaze direction detection system comprising:
   a face detection unit configured to detect face information from a captured image of a spectator,
   a head pose unit configured to detect a head pose angle based on the face information;
   an eye measurement unit configured to detect eye information of at-least one of a left eye or a right eye of the spectator based on the detected face information;
   an eye-gaze detection unit configured to estimate a gaze angle of the at-least one of the left eye or the right eye of the subject based on the eye information;
   a conditional gaze detection unit configured to calculate a resultant gaze angle based on the estimated gaze angles of the left eye and right eye and the head pose angle; and
   an effective gaze detection unit configured to estimate an effective gaze angle based the resultant gaze angle and head-pose angle.

2. The system as claimed in claim 1, further comprising:
   an impression detection unit configured to predict whether or not the spectator is gazing at an object based on the effective gaze angle, said prediction being based on a prediction formula obtained from at least one of:
      a relationship between the eye gaze angle of each eye and the head pose angle; and
      the estimated effective gaze angle.

3. The system as claimed in claim 1, further comprising an imaging-unit configured to capture an image of a spectator and communicating the image to the face detection unit for face detection.

4. The system as claimed in claim 1, wherein the eye measurement unit is configured to detect an eye-center information and eye-pupil information as the eye information.

5. The system as claimed in claim 1, further comprising an age/gender detection unit configured to identify at least one of an age, gender or a race of the spectator based on the face information and thereby enable the estimation of the gaze angle by the eye-gaze detection unit.

6. The system as claimed in claim 1, wherein the eye-gaze detection unit is configured to compute:
   the gaze angle of the left eye based on a distance between a center of the left eye and a center of the left eye's pupil and a statistical human eye radius, and
   the gaze angle of right eye based on a distance between a center of the right eye and a center of the right eye's pupil and the statistical human eye radius.

7. The system as claimed in claim 6, wherein the center of the right eye or the left eye corresponds to the eye information, and the center of the right pupil or the left pupil of the respective right eye or the left eye corresponds to the pupil information of the spectator.

8. The system as claimed in claim 1, wherein the eye-gaze detection unit configured to estimate the gaze angle for the left eye based on the steps of:
   receive a first distance (A) between a center of the left eye and a center of the left eye's pupil, said first distance quantified in pixels and having been determined based on gaze tracking;
   receive a second distance (B) between a center of the left eye and a center of the right eye in pixels, said second distance quantified in pixels and having been determined based on face landmark detection;
   compute a ratio (A/B) of first distance to the second distance;
   calculate a displacement (x) between a center of the eye and center of the pupil of the eye in a decimal numeral system based on said ratio and a statistical inter eye distance of human being;
   calculate the gaze angle (a) of the left eye based on said displacement (x) and a statistical human-eye radius,
   wherein an average inter-eye distance and an average radius of the human eye is computed based on the identified least one of an age, gender or a race of the subject.

9. The system as claimed in claim 1, wherein the eye measurement unit is configured to correct the determined eye center based on the steps of:
   determine an Eye Aspect Ratio (EAR) information of the spectator;
   observing variation in face pitch based on a head pose information of the spectator;
   correcting the EAR based on the said observed variation;
   correcting the determined eye center based on shifting by a predetermined number of pixels based on said corrected EAR, said correction comprising shifting the center of at least one of the left eye or the right eye of the subject in accordance with the corrected EAR; and
   calculating the gaze angle based on the shifted center of at least one of the left eye or the right eye of the subject.

10. The system as claimed in claim 1, wherein the conditional gaze detection unit is configured to calculate the resultant gaze angle based on the gaze angle of the left eye and the right eye and the head pose angle by analyzing a contribution level of left eye and right eye, said calculation of the resultant gaze angle based on the steps of:
   weighing a contribution level of the right eye as higher when the head pose corresponds to a leftward head movement of the spectator,
   weighing a contribution level of the left eye as higher when the head pose corresponds to a rightward head movement of the subject,
   calculating said resultant angle as a conditional gaze angle based on integration of one or more of:
      the weighed contribution level of left eye and the right eye,
      the determined gaze angle of the right eye and left eye, and
      the head pose angle,
   and
   triggering said impression detection unit configured to draw the prediction as to whether or not the spectator is gazing at an object based on said resultant angle and said effective gaze angle.

11. A method for gaze direction detection comprising:
   detecting face information from a captured image of a spectator,
   detecting a head pose angle based on the face information;

determining an eye information of at-least one of a left eye or a right eye of the spectator based on the detected face information;
estimating a gaze angle of the at-least one of the left eye or the right eye of the subject based on the eye information;
calculating a resultant gaze angle based on the estimated gaze angles of the left eye and right eye and the head pose angle; and
estimating an effective gaze angle based the resultant gaze angle and head-pose angle.

12. The method as claimed in claim 11, further comprising:
predicting whether or not the spectator is gazing at an object based on the effective gaze angle, said prediction being based on a prediction formula obtained from at least one of:
a relationship between the eye gaze angle of each eye and the head pose angle; and
the computed effective gaze angle.

13. The method as claimed in claim 11, further comprising:
identifying at least one of an age, gender or a race of the spectator based on the face information and thereby enable the enable the estimation of the gaze angle.

14. The method as claimed in claim 11, wherein the determining the eye gaze angle comprises computing one or more of:
the gaze angle of the left eye based on a distance between a center of the left eye and a center of the left eye's pupil and an statistical human eye radius, and
the gaze angle of right eye based on a distance between a center of the right eye and a center of the right eye's pupil and the statistical human eye radius.

15. The method as claimed in claim 14, wherein the center of the right eye or the left eye corresponds to the eye information, and the center of the right pupil or the left pupil of the respective right eye or the left eye corresponds to the pupil information of the spectator.

16. The method as claimed in claim 11, wherein determining of the gaze-angle for the left eye is based on the steps of:
receive a first distance between a center of the left eye and a center of the left eye's pupil (A), said first distance quantified in pixels and having been determined based on gaze tracking;
receive a second distance between a center of the left eye and a center of the right eye (B) in pixels, said second distance quantified in pixels and having been determined based on face landmark detection;
compute a ratio (A/B) of first distance to the second distance;
calculate a displacement (x) between a center of the eye and center of the pupil of the eye in decimal numeral system based on said ratio and a statistical inter eye distance of human being; and
calculate the gaze angle (a) of the left eye based on said displacement (x) and a statistical human-eye radius;
wherein the average inter-eye distance and average radius of the human eye is computed based on the identified least one of an age, gender or a race of the subject.

17. The method as claimed in claim 11, wherein the determination of the eye information is based on correcting the determined eye center based on the steps of:
determining an Eye Aspect Ratio (EAR) information of the spectator;
observing variation in face pitch based on a head pose information of the spectator;
correcting the EAR based on the said observed variation;
correcting the determined eye center by a predetermined number of pixels by said corrected EAR, said correcting comprising shifting the center of at least one of the left eye or the right eye of the subject in accordance with the corrected EAR; and
calculating the gaze angle based on the shifted center of at least one of the left eye or the right eye of the subject.

18. The method as claimed in claim 11, wherein the determination of the conditional gaze angle is based on the steps of:
weighing a contribution level of the right eye as higher when the head pose corresponds to a leftward head movement of the spectator,
weighing a contribution level of the left eye as higher when the head pose corresponds to a rightward head movement of the subject,
calculating said resultant angle as a conditional gaze angle based on integration of one or more of:
the weighed contribution level of left eye or the right eye,
the determined gaze angle of the right eye and left eye, and
the head pose angle,
and
enabling the prediction as to whether or not the spectator is gazing at an object based on said resultant angle and said effective gaze angle.

19. A non-transitory computer readable medium comprising computer-executable instructions which when performed by processor cause the processor to execute a method for gaze direction detection comprising: detecting face information from a captured image of a spectator, detecting a head pose angle based on the face information; determining an eye information of at-least one of a left eye or a right eye of the spectator based on the detected face information; estimating a gaze angle of the at-least one of the left eye or the right eye of the subject based on the eye information; calculating a resultant gaze angle based on the estimated gaze angles of the left eye and right eye and the head pose angle; and estimating an effective gaze angle based the resultant gaze angle and head-pose angle.

20. The medium as claimed in claim 19, further comprising:
predicting whether or not the spectator is gazing at an object based on the effective gaze angle, said prediction being based on a prediction formula obtained from at least one of:
a relationship between the eye gaze angle of each eye and the head pose angle; and
the estimated effective gaze angle.

* * * * *